(12) United States Patent
Demetri

(10) Patent No.: US 8,245,532 B2
(45) Date of Patent: Aug. 21, 2012

(54) SEMI-CLOSED AIR-CYCLE REFRIGERATION SYSTEM AND A POSITIVE-PRESSURE SNOW REMOVAL CYCLONE SEPARATOR THEREFOR

(75) Inventor: Elia P. Demetri, Westford, MA (US)

(73) Assignee: Concepts ETI, Inc., White River Junction, VT (US)

( * ) Notice: Subject to any disclaimer, the term of this patent is extended or adjusted under 35 U.S.C. 154(b) by 1052 days.

(21) Appl. No.: 12/120,999

(22) Filed: May 15, 2008

(65) Prior Publication Data

US 2009/0282858 A1 Nov. 19, 2009

(51) Int. Cl.
*B01D 9/04* (2006.01)
*F26B 17/12* (2006.01)
(52) U.S. Cl. .............. 62/545; 62/532; 62/544; 34/166
(58) Field of Classification Search .............. 62/545, 62/401, 615; 55/295–297, 434.2, 434.3, 55/459.1; 95/271
See application file for complete search history.

(56) References Cited

U.S. PATENT DOCUMENTS

| | | | |
|---|---|---|---|
| 3,399,770 A | 9/1968 | Salomon | |
| 3,611,738 A | 10/1971 | Maurer et al. | |
| 3,893,307 A | 7/1975 | Jacobs | |
| 4,000,995 A * | 1/1977 | Morris | 55/282 |
| 4,198,302 A | 4/1980 | Johansson | |
| 4,237,689 A | 12/1980 | Sampietro | |
| 4,245,399 A * | 1/1981 | Muller et al. | 34/166 |
| 4,346,566 A | 8/1982 | McCarty et al. | |
| 4,532,779 A | 8/1985 | von der Bey et al. | |
| 4,749,387 A * | 6/1988 | Lotz | 96/417 |
| 5,002,671 A | 3/1991 | de Villiers et al. | |
| 5,009,795 A | 4/1991 | Eichler | |
| 5,147,277 A | 9/1992 | Shapiro | |

(Continued)

FOREIGN PATENT DOCUMENTS

WO WO94/00242 A1 1/1994

(Continued)

OTHER PUBLICATIONS

Thomas Pelsoci, Closed-Cycle Air Refrigeration Technology for Cross-Cutting Applications in Food Processing, Volatile Organic Compound Recovery, and Liquid Natural Gas Industries, Dec. 2001, Advanced Technology Program, National Institute of Standards and Technology, Gaithersburg, MD, pp. 1-74.

(Continued)

*Primary Examiner* — Frantz Jules
*Assistant Examiner* — Keith Raymond
(74) *Attorney, Agent, or Firm* — Downs Rachlin Martin PLLC

(57) ABSTRACT

A refrigeration system that includes at least one semi-closed air-refrigerated chamber and an air-cycle refrigeration loop for drawing air from the refrigerated chamber(s), cools the air, and returns the now-cooled air to the refrigerated chamber(s). The refrigeration loop includes various compression, expansion and heat transfer stages for cooling the air drawn from the refrigerated chamber(s). The air within the refrigerated chamber and air infiltrating into the refrigerated chamber(s) will typically contain moisture. A positive-pressure cyclone separator located between a final expansion stage and the refrigerated chamber(s) removes snow created in the final expansion stage due to moisture in the air drawn from the refrigerated chamber(s).

35 Claims, 3 Drawing Sheets

U.S. PATENT DOCUMENTS

| | | | |
|---|---|---|---|
| 5,156,751 A | 10/1992 | Miller | |
| 5,699,672 A * | 12/1997 | Foerster et al. | 62/86 |
| 6,440,317 B1 | 8/2002 | Koethe | |
| 6,478,163 B1 | 11/2002 | Otsuka | |
| 6,581,394 B1 * | 6/2003 | Smolenskiy | 62/172 |
| 6,666,041 B1 | 12/2003 | Agergaard | |
| 6,837,912 B1 | 1/2005 | Heumann | |
| 6,936,092 B2 * | 8/2005 | Seyffert et al. | 95/271 |
| 2008/0047239 A1 * | 2/2008 | Zheng et al. | 55/337 |

FOREIGN PATENT DOCUMENTS

WO        96-16302 A1     5/1996

OTHER PUBLICATIONS

Written Opinion and International Search Report dated Dec. 29, 2009, with regard to related PCT/US2009/043950 filed May 14, 2009, Demetri.

* cited by examiner

SEMI-CLOSED AIR-CYCLE REFRIGERATION SYSTEM AND A POSITIVE-PRESSURE SNOW REMOVAL CYCLONE SEPARATOR THEREFOR

FIELD OF THE INVENTION

The present invention generally relates to the field of refrigeration systems. In particular, the present invention is directed to a semi-closed air-cycle refrigeration system and a positive-pressure snow removal cyclone separator therefore.

BACKGROUND

Semi-closed-air-chamber refrigeration systems, for example, refrigerated warehouses, walk-in coolers and freezers, etc., have a variety of applications, such as food preservation and storage. In this context, "semi-closed" means that the cooled air-chamber (warehouse space, cooler interior, etc.) is not permanently hermetically sealed, but rather periodically or continuously has warm air infiltrating the chamber. For example, refrigerated warehouses have doors that are periodically opened and closed, as do various freezers and coolers, such as grocery freezers and coolers and walk-in freezers and coolers. Some freezers and coolers, especially ones where there is continual in and out traffic have flexible curtains in place of rigid doors.

Most conventional semi-closed-air-chamber refrigeration systems typically have two primary systems for providing chilled air to the refrigerated space. The first system is a closed-cycle mechanical refrigeration system that utilizes a chemical refrigerant, such as a chlorofluorocarbon, anhydrous ammonia and liquefied propane, that is cycled between a condenser and an evaporator. The second system is an air-handler system that circulates air from the chamber being cooled so that it passes through the evaporator before being returned to the chamber. A drawback of these types of systems is that the refrigerants used can be detrimental to the natural environment and/or humans.

Another type of refrigeration system used for semi-closed-air-chamber refrigeration systems is known as a closed-cycle air refrigeration (CCAR) system. The CCAR system typically takes the place of the chemical-refrigerant-based mechanical system described above. In a CCAR system, dry air is circulated in a closed loop between a load exchanger and a cooling system. An air-handling system circulates air from the chamber being cooled so that it passes through the load exchanger before being returned to the chamber. The reason for using a closed-air-cycle is because the air must be dry and it would be very costly to continuously dehumidify the makeup air that would be needed in an open- or semi closed-cycle air system.

SUMMARY OF THE DISCLOSURE

In one implementation, the present disclosure is directed to a refrigeration system for cooling a semi-closed air-refrigerated chamber containing air that contains water vapor. The refrigeration system includes: an air-cycle refrigeration loop for drawing air from the semi-closed air-refrigerated chamber and returning the air to the semi-closed air-refrigerated chamber, the air-cycle loop including: machinery for compressing, removing heat from, and expanding the air drawn from the semi-closed air-refrigerated chamber so as to cool the air and form ice particles from the water vapor; and a positive-pressure cyclone separator, located downstream of the machinery, for removing the ice particles from the air cooled by the machinery.

In another implementation, the present disclosure is directed to a refrigeration system. The refrigeration system includes: a semi-closed air-refrigerated chamber containing air that contains water vapor; an air-cycle refrigeration loop fluidly connected to the semi-closed refrigeration chamber so as to draw the air from the semi-closed air-refrigerated chamber and return the air to the semi-closed air-refrigerated chamber, the air-cycle refrigeration loop including: machinery for compressing, removing heat from, and expanding the air drawn from the semi-closed air-refrigerated chamber so as to cool the air and form ice particles from the water vapor; and a positive-pressure cyclone separator located downstream of the machinery for removing at least a portion of the ice particles from the air prior to the air being returned to the semi-closed air-refrigerated chamber, the positive-pressure cyclone separator including: a cyclone vessel that includes a sidewall having a frusto-conical portion defining a frusto-conical separation chamber having a longitudinal central axis and an open central separation region immediately surrounding and extending along the central axis; and a scraper confronting the sidewall at the frusto-conical portions and configured to lie radially outward from the open central separation region, wherein the scraper is movable relative to the sidewall so as to scrape a buildup of ice particles from the frusto-conical portion during operation of the refrigeration loop.

In a further implementation, the present disclosure is directed to a positive-pressure cyclone separator for use with air containing a plurality of particulates consisting essentially of water. The cyclone separator includes: a cyclone vessel that includes a sidewall having an upper end, a lower end, and a frusto-conical portion defining a frusto-conical separation chamber having a longitudinal central axis and an open central separation region immediately surrounding and extending along the central axis; a scraper confronting the sidewall at the frusto-conical portions and configured to lie radially outward from the open central separation region, wherein the scraper is movable relative to the sidewall so as to scrape a buildup of ice particles from the frusto-conical portion during operation of the positive-pressure cyclone separator; an inlet located and oriented to provide the air to the cyclone vessel so as to cause a cyclonic flow within the open central separation region; and an outlet at the lower end of the sidewall for receiving ice from the buildup scraped from the sidewall by the scraper during use.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
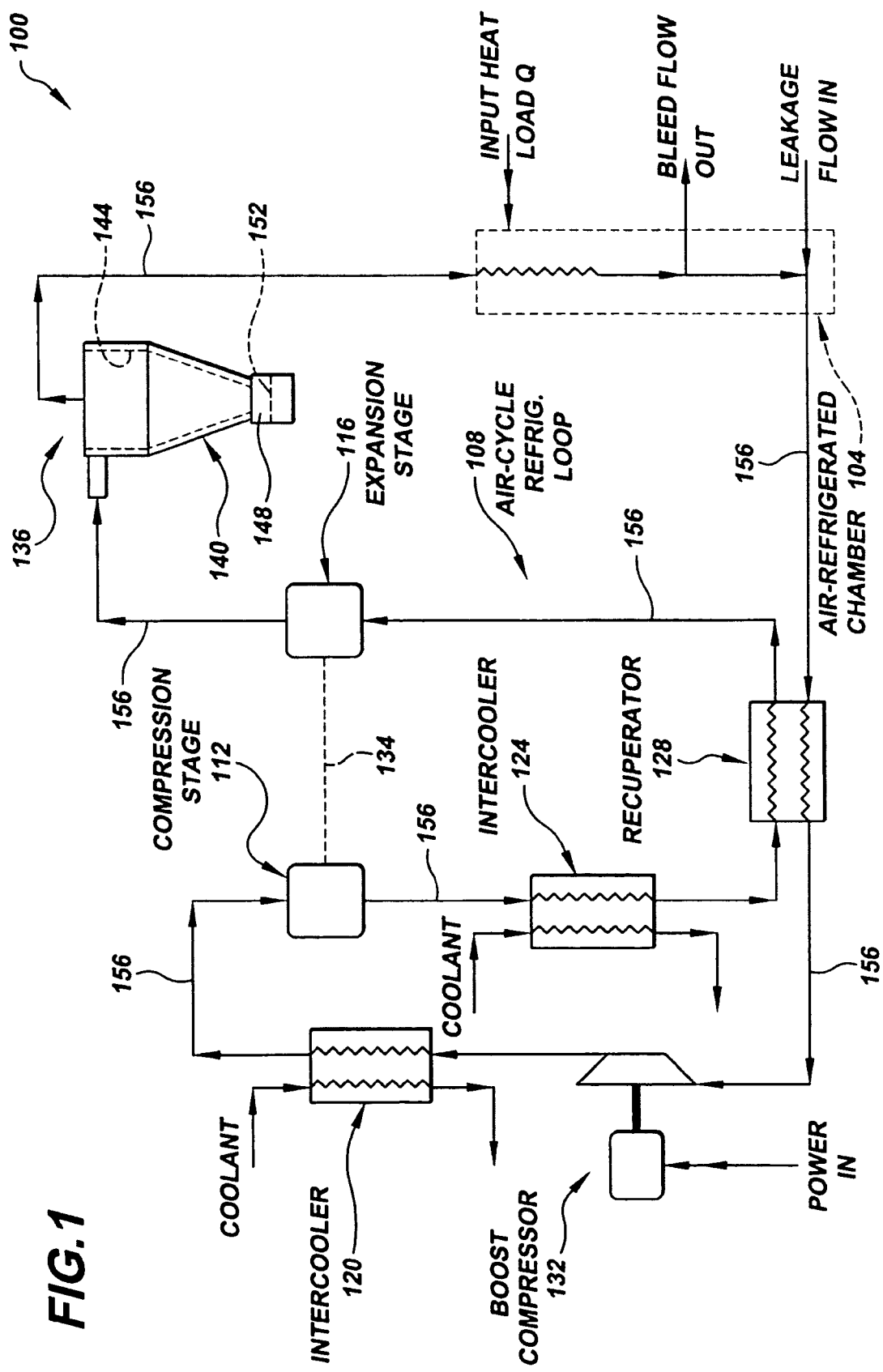
FIG. 1 is a high-level schematic diagram of a semi-closed air-chamber refrigeration system made in accordance with the present disclosure.

Referring now to the drawings, FIG. 1 illustrates a semi-closed-air-chamber refrigeration (SCACR) system 100 made in accordance with concepts set forth in the present disclosure. SCACR system 100 includes one or more semi-closed air-refrigerated chambers, here a single chamber 104, and an air refrigeration loop 108 that draws air from the chamber (including air that infiltrates or otherwise enters the chamber from the ambient environment surrounding the chamber), cools the air and returns the now-cooled air to the chamber. Examples of semi-closed chambers that semi-closed chamber 100 may include, but are not limited to, refrigerated warehouses, refrigerated box-cars and trailers, walk-in coolers and freezers, chest-type coolers and freezers, flash-freezers and any other type of chamber or space where ambient air from outside that chamber or space readily and frequently enters into the chamber during its continuing use. While refrigeration loop 108 is particularly suited to commercial, industrial and institutional scale chambers, it is contemplated that refrigeration loop 108 may be scaled down to smaller systems as well.

An SCACR system of the present disclosure, such as SCACR system 100 of FIG. 1, is unique in that the air used to cool each refrigerated chamber (104 in FIG. 1) is the air drawn from the refrigerated chamber(s), which includes ambient air that has infiltrated the chamber(s). Refrigeration loop 108 utilizes air compression and expansion stages 112, 116, respectively, along with various heat exchangers, here intercoolers 120, 124 and recouperator 128, and a boost compressor 132 to serially compress and cool the air, and then expand the cooled air to further cool it. This type of semi-closed air refrigeration loop has been avoided in the past because of the inherent problem that, because the loop is partially open, air entering the loop, here via semi-closed refrigerated chamber 104, typically contains moisture. This moisture is detrimental at least because at expansion stage 116 this moisture freezes and generates ice particles (snow) in the refrigerated air downstream of the expansion stage. This snow is problematic because it leads to snow buildup in the conduits carrying the refrigerated air downstream of expansion stage and/or within each refrigerated chamber 104 itself.

While the present inventor is aware that a separator has been used in an air refrigeration system to aid in removing ice crystals downstream of an expansion stage of the system (see U.S. Pat. No. 4,749,387 ("the '387 patent")), it appears that this separator works only at a negative pressure, i.e., air has to be drawn out of the separator to create the necessary environment for the separator to work, and it also appears that the ice crystals in that type of separator are relatively large compared to the size of the ice particles contemplated in the present invention. This is so because the separator of the '387 patent works by rapidly changing the direction of the incoming ice-crystal-laden air from downward to upward so that inertial and gravitational forces on the crystals causes the crystals to fall out of the air stream and collect in a collection vessel below. Very small particles would not necessarily fall out of the changing-direction flow as readily as larger particles.

In diametric contrast to the negative pressure separator of the '387 patent, SCACR system 100 of FIG. 1 is a positive pressure system in which refrigeration chamber 104 and components between expansion stage 116 and the refrigeration chamber are under positive pressure. Positive pressure is desired in refrigeration chamber 104 so as to minimize the amount of ambient air infiltration. Because a goal of an SCACR system of the present disclosure to provide a system in which the expansion of the air in expansion stage 116 is very rapid, the ice particles will typically be very small. In one example, ice particles formed by nucleation in expansion stage 116 will generally be in the range of 10 microns to 100 microns or smaller, especially when the residence time of the expanded air is low. However, in other examples, the size range may be different and may include larger and/or smaller sizes. Consequently, even if the separator of the '387 patent could work under positive pressure, it would not appear that it would be suitable for ice particles of the very small size regime contemplated in some implementations of an SCACR system of the present disclosure, such as SCACR system 100 of FIG. 1 because it relies on gravitational forces to achieve separation which are weaker than the centrifugal forces created in the cyclone separator employed in the present invention.

To remove the unwanted snow from the effluent of rapid expansion stage 116, SCACR system 100 includes a unique cyclone separator 136 that includes a cyclone vessel 140 and an interior scraper 144 that is shaped to conform to the interior of the cyclone vessel. During operation, scraper 144 is moved relative to cyclone vessel 140, either continually or periodically, to remove ice particles collected on the interior walls of the cyclone vessel and force them to the bottom of cyclone separator 136, which includes a melting chamber 148 where the collected ice 152 is melted and drawn away from the separator as water. As mentioned above, positive pressure is desired in refrigerated chamber 104 to minimize air infiltration into the chamber. Positive pressure is also desired within cyclone separator 136 to minimize the amount of power needed to run SCACR system 100. For example, if positive-pressure cyclone separator 136 were replaced by a negative-pressure separator (if this could be done at all based on the very small size ice particles in the effluent of expansion stage 116), the only way to provide this negative pressure in the separator while at the same time providing positive pressure to refrigerated chamber 104 would be to use some sort of fan or other air-moving device between the expansion stage and the refrigerated chamber. However, the energy needed to run such a device would clearly negatively impact the energy efficiency of the overall SCACR system 100. Therefore, a negative-pressure separator is undesirable. Details of an example of a positive-pressure cyclone separator 200 suitable for use as cyclone separator 136 of FIG. 1 is illustrated below in connection with FIGS. 2 and 3. However, prior to describing cyclone separator 200, other components of SCACR system 100 of FIG. 1 are described first below for the sake of completeness.

As mentioned above, SCACR system 100 of FIG. 1 includes a number of elements other than cyclone separator 136, that provide the refrigeration functionality of refrigeration loop 108. These elements include a compression stage 112, an expansion stage 116, intercoolers 120, 124, recouperator 128 and boost compressor 132. In one embodiment, compression and expansion stages 112, 116 may be provided by a conventional turbomachine (not shown) having a turbo-compressor and turbo-expander linked to one another by a common shaft (this direct mechanical link is represented in FIG. 1 by dashed line 134 between compression and expansion stages 112, 116). Those skilled in the art will readily understand such a conventional turbomachine, its operation and how it can be implemented in refrigeration loops of various thermal capacities such that further explanation of such a turbomachine is not necessary for those skilled in the art to understand and implement the present invention to its broadest scope. Alternatively, compression and expansion stages 112, 116 may be provided by one or more other types of machines as may be known in the art.

For reasons well-known in the art, intercooler 120 removes heat from the air stream 156 following its compression by boost compressor 132 before the air stream reaches compression stage 112. Similarly, intercooler 124 removes heat from air stream 156 following compression stage 112 prior to the air stream entering expansion stage 116. Intercoolers suitable for use as intercoolers 120, 124 are well known in the art. Intercoolers 120, 124 may be cooled using a coolant, such as ambient air or water among others. The water can be provided from a suitable source, such as a river or lake or from a cooling tower, among others. Recuperator 128 removes additional heat from air stream 156 between compression and expansion stages 112, 116 using the return air from refrigerated chamber 104. Similar to intercoolers 120, 124, recuperators suitable for use as recuperator 128 are well known and understood in the art and need not be described in any detail herein for those skilled in the art to make and use the present invention to its fullest scope. Boost compressor 132 may be any suitable type of compressor known in the art for such applications. For example, boost compressor 132 may be a turbomachine or reciprocating machine. Those skilled in the art will readily appreciate that the numbers and locations relative to one another of intercoolers 120, 124, recuperator 128 and boost compressor 132 in SCACR system 100 are illustrative and may be different in alternative embodiments of a SCACR system made in accordance with the present disclosure. For example, one or both of intercoolers 120, 124 may each be replaced by a series of intercoolers to provide staged cooling of air stream 156. As another example, recuperator 128 may be eliminated, though this may not be desirable from an energy efficiency viewpoint.

Figure 3:
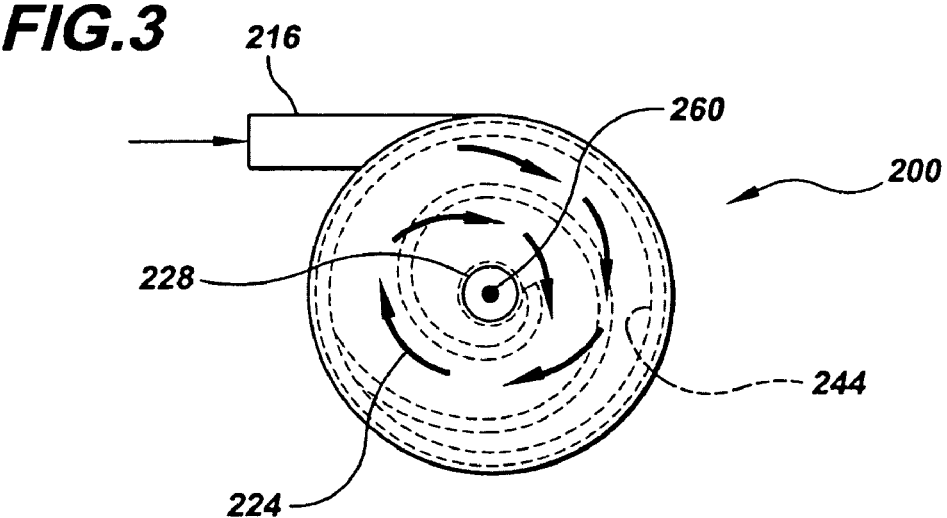
FIG. 3 is a plan view of the positive-pressure cyclone separator of FIG. 2.
Figure 2:
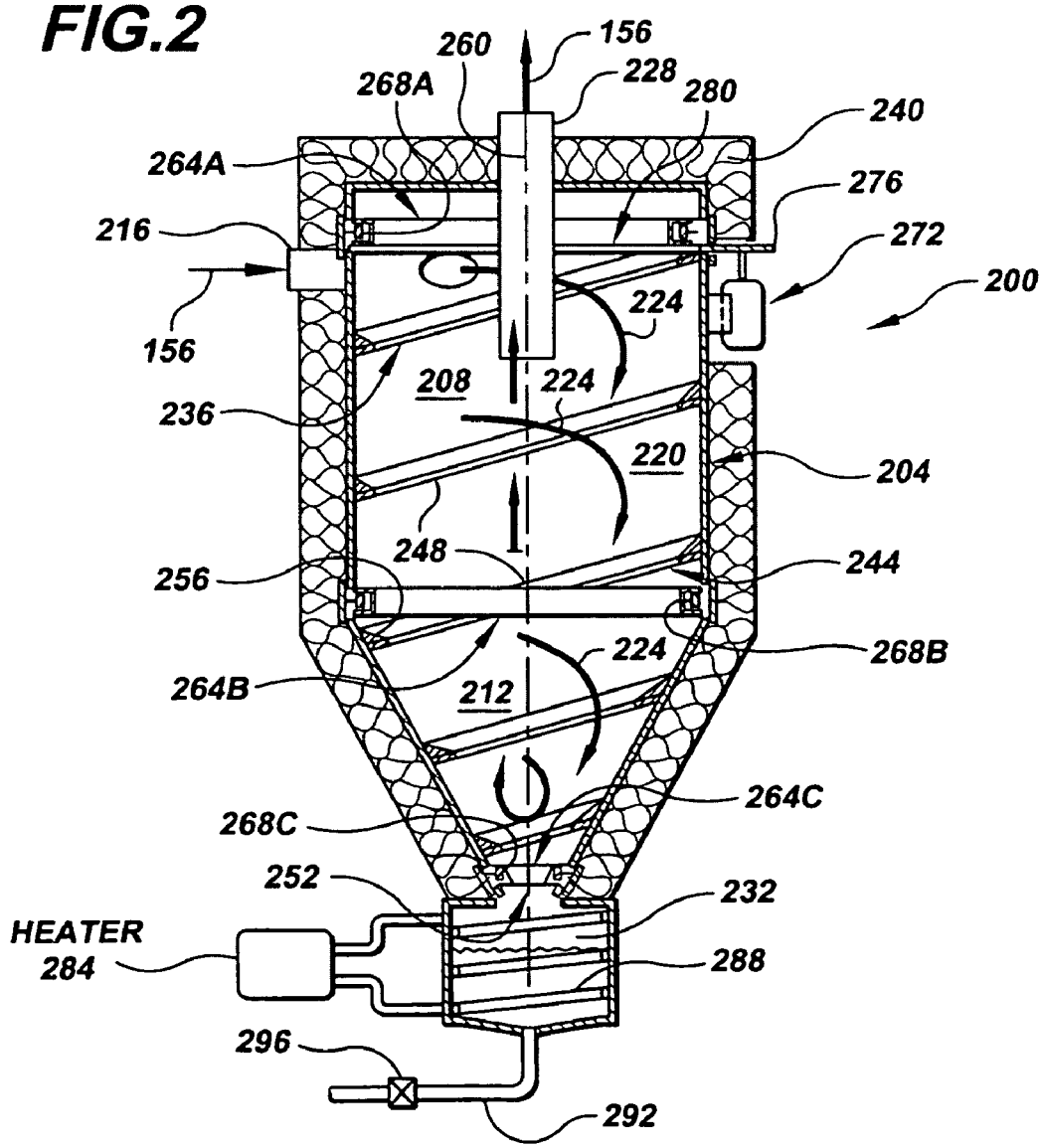
FIG. 2 is a cross-sectional elevational view of a positive-pressure cyclone separator made in accordance with the present disclosure that can be used in a semi-closed air-cycle refrigeration system, such as the system of FIG. 1.

Referring now to FIGS. 2 and 3, these figures illustrate a positive-pressure cyclone separator 200 that, as mentioned above, is suitable for use as cyclone separator 136 of FIG. 1 or as a separator for snow and/or other particulate in another system. Cyclone separator 200, however, is particularly adapted for the very fine ice particles mentioned above that are caused by the rapid expansion of moisture-containing air, such as found in SCACR system 100 of FIG. 1.

Referring to FIG. 2, and occasionally to FIG. 3 as indicated, as shown in FIG. 2, cyclone separator 200 includes a cyclone vessel 204 that, in this example includes a cylindrical upper portion 208 and a frusto-conical lower portion 212. Cyclone separator 200 also includes an inlet 216 that provides to the interior 220 of the separator an air stream containing particulate to be removed by the separator, such as air stream 156 of FIG. 1 containing small ice particles from expansion stage 116. As in conventional cyclone separators, inlet 216 is located and oriented so as to introduce air stream 156 near the upper end of cyclone separator 200 and to induce a cyclonic flow 224 within the interior 220 of the separator. FIG. 3 particularly shows how inlet 216 may be located and oriented generally tangentially to achieve the desired cyclonic flow 224. within cyclone separator 200. Cyclone separator 200 also includes an outlet 228 (FIGS. 2 and 3) that extends a predetermined distance into interior 220 of the separator.

Referring to FIG. 2, as those skilled in the art will appreciate, it is the combination of the offset introduction of air stream 156 and the shape of cyclone vessel 204 that produce the desired flow cyclonic flow 224 (FIGS. 2 and 3) that develops the centrifugal force necessary to cause particles (not shown) in the air stream to impact upon the interior walls of the vessel. As those skilled in the art will understand, design parameters, such as overall diameter and height of cyclone vessel 204, taper angle and height of frusto-conical portion, size, location and offset angle of inlet 216 and size, location and extension into the cyclone vessel of outlet 228, (also seen in FIG. 3), among others, may be varied to achieve the desired removal efficiency for cyclone separator 200. As those skilled in the art will understand, the removal efficiency of cyclone separator 200 indicates in some manner the amount of ice particles removed from air stream 156 by the separator relative to the amount of ice particles present in the air stream just before entering the separator. This removal efficiency may be expressed in any of a number of ways, such as percentage of weight, volume, number, etc. of the particles removed either overall or by relevant particle size (useful where particles vary in size), or both.

In the example of FIG. 2, cyclone separator 200 further includes a melting chamber 232 and a scraping system 236 for scraping any ice particles that have collected on the interior walls of cyclone vessel 204 and/or moving such removed particles (or agglomerations thereof) to the melting chamber. In this embodiment, cyclone vessel 204 is well insulated with a suitable insulation 240 on its exterior so that the cyclone vessel itself remains at a temperature as close as possible to the temperature of air stream 156 entering the vessel. Keeping cyclone vessel 204 at a temperature near the temperature of air stream 156 entering the vessel not only acts to avoid heating the air stream, thereby lowering the thermal efficiency of the overall system of which cyclone separator 200 is part, but it also inhibits melting of the particles collecting on the interior surfaces of the cyclone vessel, thereby keeping the buildup of ice particles from becoming solid ice that would be formed by melting and refreezing.

Scraping system 236 includes a helical scraper 244 (also seen in FIG. 3) having a plurality of spaced flights 248 that are in contact with or close proximity to the interior surfaces of the sidewalls of cyclone vessel 204 so as to allow the flights to scrape or otherwise remove buildup of ice particles from those sidewalls. As can be readily seen, flights 248 of scraper 244 conform not only to the sidewalls of cylindrical upper portion 208 of cyclone vessel 204, but also to the tapering sidewall of frusto-conical lower portion 212. Due to its helical configuration, scraper 244 can act to push any accumulation of buildup with cyclone vessel 204, especially near the constricted lower end of frusto-conical lower portion 212 in the event that blockage of the outlet 252 of the vessel were to occur. As shown in FIG. 2, the upper surfaces 256 of flights 248 may be angled so as to inhibit the collection thereon of falling masses of particles removed from above. Scraper 244 may be made of a material suitable for the size of cyclone separator 200 at issue. For example, for relatively large separators, i.e., ones measured in feet or meters, scraper 244 can be largely or entirely made of a suitable metal, such as steel (stainless or not), aluminum, etc. In addition, flights 248 may be at least partially made of or coated with a material that inhibits ice particles from sticking thereto, such as polytetrafluoroethylene, among others.

An important feature of scraper 244, as best seen in FIG. 3, is that its configuration in which all or substantially all of its structure is located proximate the sidewalls of cyclone vessel 204 (FIG. 2). Referring to FIG. 2, this keeps a large region of interior 220 of cyclone vessel 204, especially the central portion surrounding the longitudinal central axis 260 (also shown in FIG. 3) open and unobstructed so as to not interfere with cyclonic flow 224 during operation of cyclone separator 200.

Scraper 244 may be supported in any suitable manner. In the example shown in FIG. 2, scraper 244 is supported by three rings 264A-C located at differing levels of cyclone vessel 204. Each support ring 264A-C is C-shaped and is supported on cyclone vessel 204 by a corresponding set of roller bearings 268A-C. Because scraper 244 conforms closely to the interior surfaces of cyclone vessel 204, if it is prefabricated before being installed into the vessel, accommodation must be made to prevent its installation from being hampered by pre-installed roller bearings 268A-C. One accommodation is to make roller bearings 268A-C installable through the sidewall of cyclone vessel 204. Then, scraper 244 may be inserted and held in place within cyclone vessel 204 while the roller bearings are installed through temporary openings (not shown) in the sidewall of the vessel and engaged with corresponding respective ones of C-shaped support rings 264A-C. In a particular example, each roller bearing 268A-C may be integrated with a closure plate (not shown) for closing the temporary opening. In this example, each roller bearing 268A-C is simply inserted through a corresponding respective opening in the sidewall of cyclone vessel 204 until the closure plate contacts the sidewall of the vessel, at which time the closure plate can be secured to the sidewall, for example, by welding or using mechanical fasteners.

Scraper 244 may be moved relative to cyclone vessel 204 using any suitable motive means, examples of which include one or more motors and/or actuators alone and/or in conjunction with one or more force-transferring devices, such as gear transmissions, links and linkage assemblies, among others. In the example shown in FIG. 2, scraping system 236 includes a direct drive motor 272 having a gear 276 that meshes with a toothed rack 280 affixed to support ring 264A. Gear 276 extends through a suitably sized opening in the sidewall of cyclone vessel 204. Those skilled in the art will readily appreciate that in other embodiments, scraper system 236 may have a drive system different from the direct-drive electric motor system just described. Those skilled in the art will understand how to implement such alternative drive systems.

Melting chamber 232 may be sized to hold a suitable volume of collected ice particles. For example, where scraper 244 is used only periodically, such as when a present amount of particle buildup is detected on the sidewalls of cyclone vessel or after a predetermined period, melting chamber 232 may be sized slightly larger than the total volume of the buildup that will be collected when the scraper is used. Melting chamber 232 is in communication with one or more heaters 284 used to melt any ice-particle buildup collected in the melting chamber. Depending on the type of heater(s) 284, one or more heating coils 288 may be used. Each heating coil 288 may be located within melting chamber 232 or within the sidewall of the melting chamber, or both, or may be otherwise in thermal communication with the melting chamber. It is typically most desirable to thermally isolate melting chamber 232 as much as possible from cyclone vessel 204 so as to limit the amount of heat reaching the cyclone vessel that would warm the cyclonic flow within the vessel. Heater(s) 284 may be cycled so as to be on only when needed, for example, when melting chamber 232 contains a predetermined amount of ice-particles removed from the sidewalls of cyclone vessel 204. In this manner, energy usage may be minimized so as to increase the overall energy efficiency of the system into which cyclone separator 200 is placed, such as SCACR system 100 of FIG. 1. A drain pipe 292 and valve 296 may be provided for drawing the melted ice away from cyclone separator 200.

Figure 4:
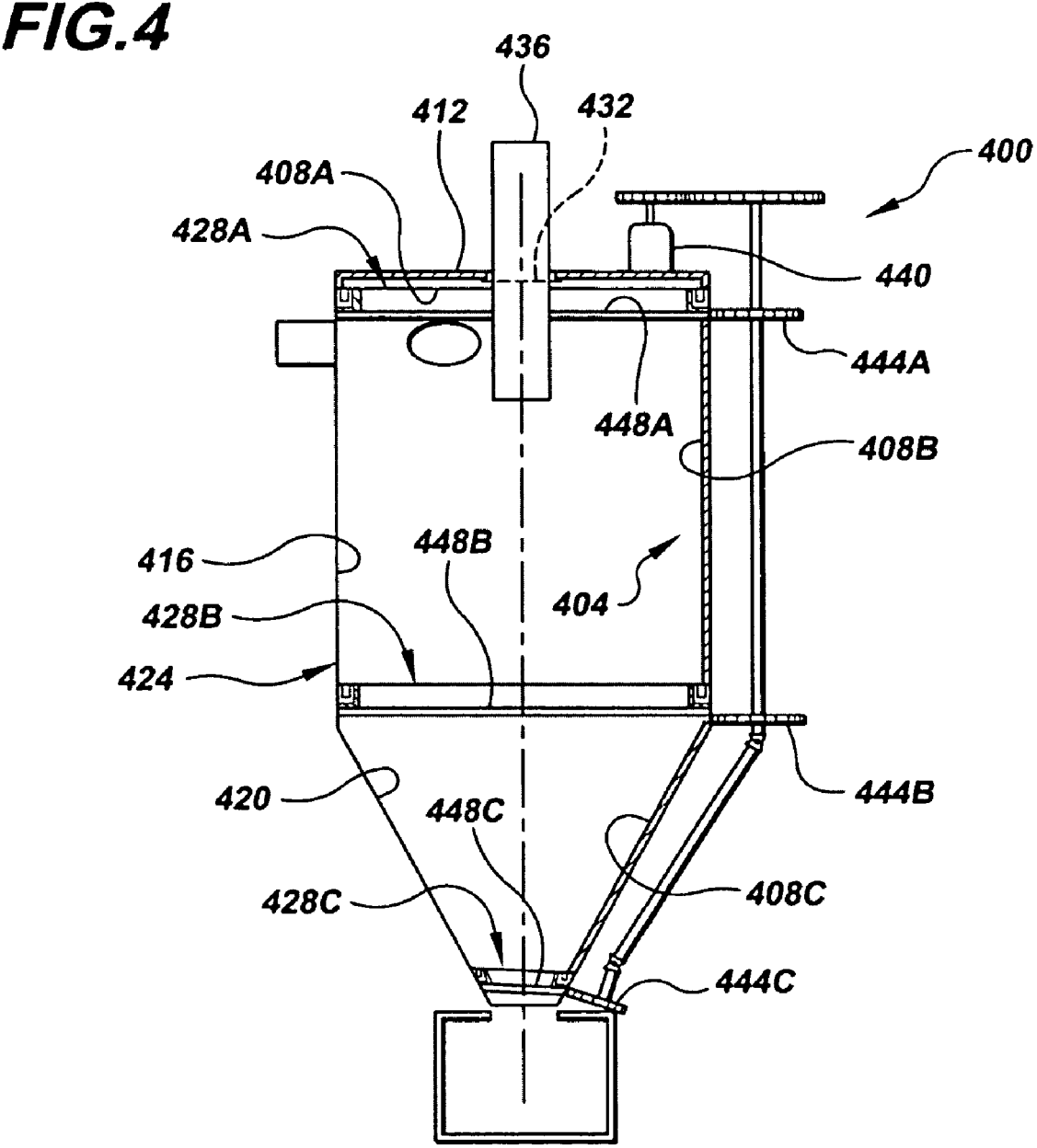
FIG. 4 is a schematic cross-sectional elevational view of another positive-pressure cyclone separator made in accordance with the present disclosure that can be used in a semi-closed air-cycle refrigeration system, such as the system of FIG. 1.

FIG. 4 illustrates another positive-pressure cyclone separator 400 that is suitable for use in SCACR system 100 of FIG. 1 as cyclone separator 136. Cyclone separator 400 of FIG. 4 may be considered to be identical, or nearly identical, to cyclone separator 200 of FIGS. 2 and 3, except for the scraping system 404, which is different from scraping system 236 of FIGS. 2 and 3. In the embodiment of FIG. 4, scraping system 404 includes three scraping blades 408A-C that are in contact with or in close proximity to upper wall 412, cylindrical sidewall 416 and tapered sidewall 420 of cyclone vessel 424. Scraping blades 408A-C may be supported in any suitable manner, such as by a C-shaped support and roller bearing arrangement similar to the like arrangement of FIG. 2. Referring to FIG. 4, this arrangement includes three C-shaped support rings 428A-C, with scraping blade 408A extending between two diametrically opposed points on support ring 428A (with an annular portion 432 in the middle surrounding outlet 436 to transfer loads around the outlet), scraping blade 408B extending from support ring 428A to support ring 428B, and scraping blade 408C extending from support ring 428B to support ring 428C. Scraping blades are driven by an electric motor 440 and a set of gears 444A-C that mesh with corresponding racks 448A-C on respective support rings 428A-C. In this drive system, of course gear 444C is smaller in diameter than both of gears 444A-B to account for the smaller diameter of support ring 428C relative to support rings 428A-B.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A refrigeration system for cooling a semi-closed air-refrigerated chamber containing air that contains water vapor, comprising:

an air-cycle refrigeration loop for drawing air from the semi-closed air-refrigerated chamber and returning the air to the semi-closed air-refrigerated chamber, said air-cycle loop including:
machinery for compressing, removing heat from, and expanding the air drawn from the semi-closed air-refrigerated chamber so as to cool the air and form ice particles from the water vapor; and
a positive-pressure cyclone separator, located downstream of said machinery, for removing the ice particles from the air cooled by said machinery, said positive-pressure cyclone separator including:
a cyclone vessel that includes a sidewall having a frusto-conical portion defining a frusto-conical separation chamber having a longitudinal central axis and an open central separation region immediately surrounding and extending along said central axis;
a scraper confronting said sidewall at said frusto-conical portion and configured to lie radially outward from said open central separation region, wherein said scraper is movable relative to said sidewall so as to scrape a buildup of ice particles from said frusto-conical portion during operation of the refrigeration loop; and
a scraper support system supporting said scraper so that none of said scraper support system is located along said longitudinal central axis of said cyclone vessel and so that none of said support system is located within said open central separation region of said cyclone vessel.

2. A refrigeration system according to claim 1, wherein said machinery includes a rapid expansion stage located immediately upstream of said positive-pressure cyclone separator.

3. A refrigeration system according to claim 2, wherein said rapid expansion stage produces ice particles in the range of 10 microns to 100 microns during operation of said air-cycle refrigeration loop and said positive-pressure cyclone separator is configured to remove at least a portion of the ice particles during operation of said air-cycle refrigeration loop.

4. A refrigeration system according to claim 1, wherein said positive-pressure cyclone separator has a lower end and further comprises a heater located proximate said lower end.

5. A refrigeration system according to claim 1, further comprising one or more intercoolers connected to said air-cycle refrigeration loop so as to remove heat from the air.

6. A refrigeration system according to claim 5, further comprising a boost compressor for compressing air received directly from the semi-closed air-refrigerated chamber.

7. A refrigeration system according to claim 6, wherein said machinery includes a compression stage and an expansion stage and a first intercooler is located between said boost compressor and said compression stage and a second intercooler is located between said compression stage and said expansion stage.

8. A refrigeration system according to claim 7, further comprising a recuperator configured to transfer heat from a first portion of said air-cycle refrigeration loop located between said compression stage and said expansion stage to a second portion of said air-cycle refrigeration loop located upstream of said boost compressor.

9. A refrigeration system according to claim 1, wherein said sidewall further includes a cylindrical portion located above and joined to said frusto-conical portion, said scraper extending along each of said frusto-conical portion and said cylindrical portion.

10. A refrigeration system according to claim 9, wherein said scraper includes a plurality of helical flights conformally confronting said sidewall so as to provide scraping action during operation of said scraper.

11. A refrigeration system according to claim 9, wherein said positive-pressure cyclone separator has a height and said scraper includes at least one scraper blade having a longitudinal axis extending along said height and said sidewall at each of said frusto-conical portion and said cylindrical portion.

12. A refrigeration system according to claim 1, further comprising a scraper drive mechanism connected to said cyclone vessel, said drive mechanism for moving said scraper within said cyclone vessel.

13. A refrigeration system according to claim 9, wherein said support system includes a pair of support rings spaced along said longitudinal central axis and conformally confronting said sidewall, and said scraper extending between said pair of support rings.

14. A refrigeration system according to claim 13, further comprising a scraper drive mechanism drivingly engaging at least one support ring of said pair of support rings.

15. A refrigeration system according to claim 14, wherein said scraper comprises a plurality of helical flights confronting said sidewall of said cyclone vessel, said scraper drive mechanism designed and configured so as to rotate said scraper about said longitudinal central axis in a direction that, when particulate matter has built up on said sidewall and said longitudinal central axis is oriented vertically, pushes the particulate matter downward.

16. A refrigeration system according to claim 9, wherein said frusto-conical portion tapers to an outlet and the refrigeration system further comprises a melting chamber, wherein when said longitudinal central axis is oriented vertically, said melting chamber is located below said cyclone vessel and fluidly communicates with said cyclone vessel via said outlet.

17. A refrigeration system according to claim 1, wherein said support system includes a pair of support rings spaced along said longitudinal central axis and conformally confronting said sidewall and said scraper extending between said pair of support rings.

18. A refrigeration system according to claim 17, further comprising a scraper drive mechanism drivingly engaging at least one support ring of said pair of support rings through said sidewall of said cyclone vessel.

19. A refrigeration system according to claim 18, wherein said scraper comprises a plurality of helical flights confronting said sidewall of said cyclone vessel, said drive mechanism being designed so as to rotate said scraper about said longitudinal central axis in a direction that, when particulate matter has built up on said sidewall and said longitudinal central axis is oriented vertically, pushes the particulate matter downward.

20. A refrigeration system according to claim 1, further comprising the semi-closed air-refrigerated chamber, wherein said semi-closed air-refrigerated chamber is of a human walk-in type.

21. A positive-pressure cyclone separator for use with air containing a plurality of particulates consisting essentially of water, the cyclone separator comprising:
  a cyclone vessel that includes a sidewall having an upper end, a lower end, and a frusto-conical portion defining a frusto-conical separation chamber having a longitudinal central axis and an open central separation region immediately surrounding and extending along said central axis;
  a scraper confronting said sidewall at said frusto-conical portions and configured to lie radially outward from said open central separation region, wherein said scraper is movable relative to said sidewall so as to scrape a buildup of ice particles from said frusto-conical portion during operation of the positive-pressure cyclone separator;
  a scraper support system supporting said scraper so that none of said scraper support system is located alone said longitudinal central axis of said cyclone vessel and so that none of said support system is located within said open central separation region of said cyclone vessel;
  an inlet located and oriented to provide the air to said cyclone vessel so as to cause a cyclonic flow within said open central separation region; and
  an outlet at said lower end of said sidewall for receiving ice from the buildup scraped from said sidewall by said scraper during use.

22. A positive-pressure cyclone separator according to claim 21, further comprising a melting chamber located proximate said outlet for melting the ice received by said outlet.

23. A positive-pressure cyclone separator according to claim 22, wherein said melting chamber is thermally insulated from said cyclone vessel.

24. A positive-pressure cyclone separator according to claim 21, wherein said sidewall of said cyclone vessel further includes a cylindrical portion located above and joined to said frusto-conical portion, said scraper extending along each of said frusto-conical portion and said cylindrical portion.

25. A positive-pressure cyclone separator according to claim 24, wherein said scraper includes a plurality of helical flights conformally confronting said sidewall so as to provide scraping action during operation of said scraper.

26. A positive-pressure cyclone separator according to claim 24, wherein said cyclone vessel has a height and said scraper includes at least one scraper blade having a longitudinal axis extending along said height and said sidewall at each of said frusto-conical portion and said cylindrical portion.

27. A positive-pressure cyclone separator according to claim 26, further comprising a scraper drive mechanism connected to said cyclone vessel, said drive mechanism for moving said scraper within said cyclone vessel.

28. A positive-pressure cyclone separator according to claim 21, further comprising a scraper drive mechanism connected to said cyclone vessel, said drive mechanism for moving said scraper within said cyclone vessel.

29. A positive-pressure cyclone separator according to claim 24, wherein said support system includes a pair of support rings spaced along said longitudinal central axis and conformally confronting said sidewall, and said scraper extending between said pair of support rings.

30. A positive-pressure cyclone separator according to claim 29, further comprising a scraper drive mechanism drivingly engaging at least one support ring of said pair of support rings.

31. A positive-pressure cyclone separator according to claim 30, wherein said scraper comprises a plurality of helical flights confronting said sidewall of said cyclone vessel, said scraper drive mechanism designed and configured so as to rotate said scraper about said longitudinal central axis in a direction that, when particulate matter has built up on said sidewall and said longitudinal central axis is oriented vertically, pushes the particulate matter downward.

32. A positive-pressure cyclone separator according to claim 24, wherein said frusto-conical portion tapers to an outlet and the refrigeration system further comprises a melting chamber, wherein when said longitudinal central axis is oriented vertically, said melting chamber is located below said cyclone vessel and fluidly communicates with said cyclone vessel via said outlet.

33. A positive-pressure cyclone separator according to claim 21, wherein said support system includes a pair of support rings spaced along said longitudinal central axis and conformally confronting said sidewall and said scraper extending between said pair of support rings.

34. A positive-pressure cyclone separator according to claim 33, further comprising a scraper drive mechanism drivingly engaging at least one support ring of said pair of support rings through said sidewall of said cyclone vessel.

35. A positive-pressure cyclone separator according to claim 34, wherein said scraper comprises a plurality of helical flights confronting said sidewall of said cyclone vessel, said drive mechanism being designed so as to rotate said scraper about said longitudinal central axis in a direction that, when particulate matter has built up on said sidewall and said longitudinal central axis is oriented vertically, pushes the particulate matter downward.

* * * * *